United States Patent [19]

Cattano

[11] 4,175,725
[45] Nov. 27, 1979

[54] BATTERY STRAP AND POST CAST-ON MULTI USE MOLD

[75] Inventor: John D. Cattano, Castalia, Ohio

[73] Assignee: Dale Products, Inc., Fremont, Ohio

[21] Appl. No.: 850,100

[22] Filed: Nov. 10, 1977

[51] Int. Cl.$^2$ .......... B22D 9/06; B22D 9/08; B22D 19/04; B22D 23/04

[52] U.S. Cl. .......... 249/81; 249/102; 249/91; 249/119; 164/332; 164/348; 164/DIG. 1; 164/342; 164/341

[58] Field of Search .......... 164/108–110, 164/342, 332–334, 348, DIG. 1, 133, 137, 341; 249/119, 102, 129, 110, 81

[56] References Cited

U.S. PATENT DOCUMENTS

| | | | |
|---|---|---|---|
| 3,200,450 | 8/1965 | Buttke | 164/333 |
| 3,395,748 | 8/1968 | Tiegel | 164/332 X |
| 3,444,920 | 5/1969 | McAlpine et al. | 164/333 X |
| 3,504,731 | 4/1970 | Farmer | 164/334 X |
| 3,565,162 | 2/1971 | Farmer | 164/337 |
| 3,718,174 | 2/1973 | Hull et al. | 164/333 X |
| 3,802,488 | 4/1974 | Hull et al. | 164/332 X |
| 3,988,169 | 10/1976 | McLean | 164/DIG. 1 |
| 4,108,417 | 8/1978 | Simonson et al. | 164/332 X |

Primary Examiner—Othell M. Simpson
Assistant Examiner—Gus T. Hampilos
Attorney, Agent, or Firm—Wilson, Fraser & Clemens

[57] ABSTRACT

A composite mold construction for casting on the connector straps, posts, and terminals for lead acid electrical storage batteries according to the techniques of U.S. Pat. Nos. 3,718,174 and 3,802,488 wherein the mold cavity areas are alternately heated by direct flame on one face and then chilled by a coolant on their opposite face to freeze metal in the cavities without freezing molten metal flowing in adjacent flow channels. A plurality of mold cavity partition inserts are arranged to be interchangeable in the main mold assembly to enable a single mold assembly to be utilized for several arrangements of battery cells, strappings, and terminals. Thermal distortion of the mating parts is minimized to maintain the cavities free of leaks by interfitting under cuts and pinned or otherwise keyed couplings between the relatively thin inserts and the more massive primary portions of the mold assembly.

13 Claims, 8 Drawing Figures

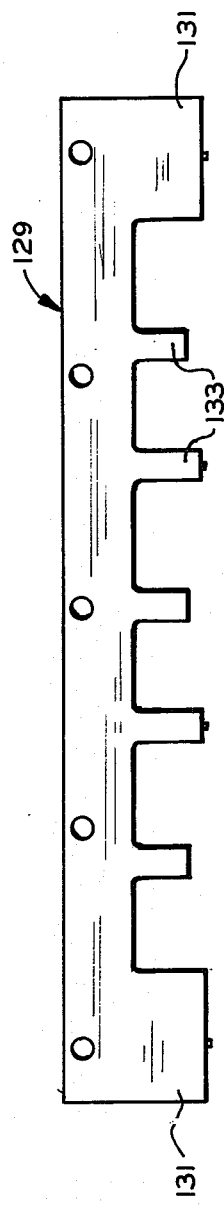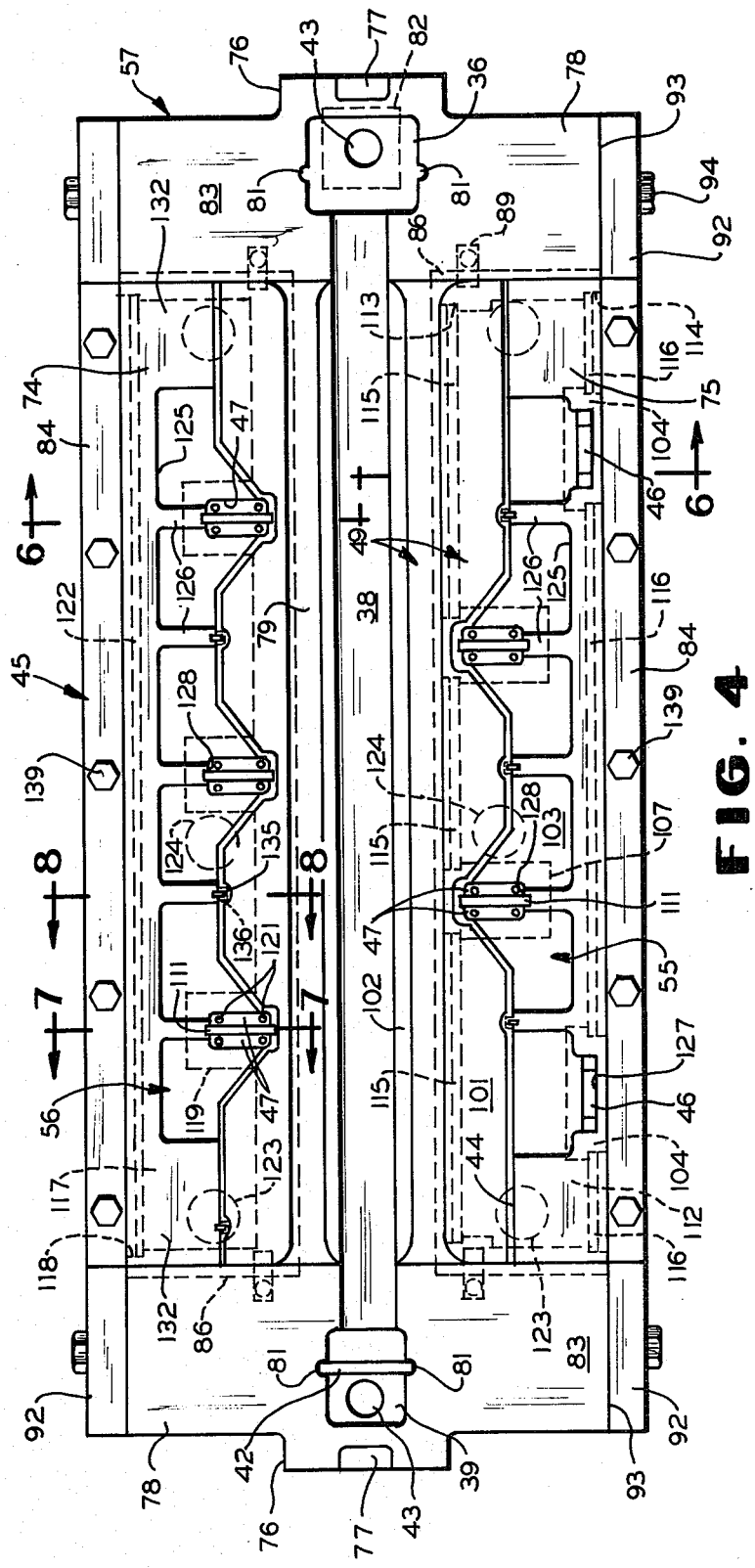

BATTERY STRAP AND POST CAST-ON MULTI USE MOLD

CROSS REFERENCE TO RELATED APPLICATION

This invention is related to that disclosed in the copending United States Patent Application of Robert D. Simonton and Carl D. Schultz, Ser. No. 600,203 filed July 30, 1975 for "Battery Post and Connector Strap Mold", now U.S. Pat. No. 4,108,417.

BACKGROUND OF THE INVENTION

1. Field of the Invention

This invention relates to machines for manufacturing lead acid electrical storage batteries and more particularly to molds for casting-on of the connector straps joining the lugs on the plates of the cells and the posts employed as cell interconnectors and terminals for such batteries. 2. Description of the Prior Art Heretofore, it has been known to cast-on the plate lug connector straps for cells, the cell posts employed to interconnect cells, and the posts forming terminals for batteries by stacking the positive and negative battery plates with suitable interleaved insulating separators, and casting the post and the straps between the lugs of the positive plates and between the lugs of the negative plates of cells while the stacks are maintained with their lugs projecting downward. U.S. Pat. Nos. 3,718,174 and 3,802,488 issued respectively Feb. 27, 1973 and Apr. 9, 1974 to Donald R. Hull and Robert D. Simonton disclose cast-on apparatus including a loading station, a casting station and an unloading station arranged so that a carriage including cell stack clamps can be moved between the stations. The casting station has a mold assembly including a flow channel for molten metal supplied at an input from a suitable reservoir and returned from an exit to that reservoir. Mold cavities are arranged along the flow channel in a pattern and form to define the straps and posts. The cavities are filled by impeding the exit of molten metal from the flow channel so that its level rises and overflows weirs intermediate the channel and cavities by flooding an internal region of the upper surface of the mold which is enclosed by a dam, thus forming a pool of molten metal. After the cavities are overflow filled, the flow channel exit is opened to permit the level of molten metal to recede and the downwardly projecting plate plugs of the cell groups retained in the carriage are lowered into the molten metal in the registering strap mold cavities. The cavities are then chilled to freeze the molten metal and the frozen straps and posts are ejected from their cavities as the carriage is elevated to raise the plates with their cast-on straps and posts for traverse to the unloading station.

In operation the mold assemblies in the casting station is subjected to rigorous thermal requirements. The flow channel must convey molten metal throughout the freezing of metal in the cavities, hence its walls should remain at a temperature above the freezing point of the metal. The mold cavities should have a minimum thermal inertia so they can be rapidly raised above and then chilled below the melting temperature of the metal to provide short cycle times and economic production rates. The metallurgical requirements of the operation dictate warming the mold cavities before they are filled and deoxidizing the molten metal surface before insertion of the plate lugs. These requirements are met by directing a deoxidizing flame over the upper face of the mold assembly prior to and following the overflow filling of the mold cavities.

As disclosed in the aforenoted copending patent application Ser. No. 600,203, now U.S. Pat. No. 4,108,417 the desired thermal patterns in the mold assembly are achieved by utilizing a massive base for the mold assembly in which the flow channel and its input and exit are formed and by forming the mold cavities with relatively thin walls and with coolant passages in close proximity to the cavities. Advantageously, the cavities are formed in elements separate from the base and with thermal insulating barriers between them and the base so that their relatively low thermal inertia permits rapid thermal cycling without altering the base temperature to the same extremes of temperature.

Mold assemblies and battery plate stack clamps for the machines under discussion are demountable to enable the machines to be utilized in the manufacture of a number of different battery forms. Typically, lead-acid batteries are manufactured with standard case sizes and with different cell and terminal arrangements. Thus a given overall outer dimension for the cell assembly to be housed in a given casing might be made up of six cells having eleven, thirteen, or fifteen plates per cell, having various terminal arrangements wherein the terminals are on the same side or on opposite sides, and wherein the spacings of the lug straps or terminal and connecting posts from the longitudinal center line of the battery are different.

The demountable mold assemblies are expensive. When a mold assembly is employed for strap and post configuration, a manufacturer is required to maintain a large inventory of mold assemblies, much of which is idle at any given instant.

SUMMARY OF THE INVENTION

The present invention relates to a mold assembly of the type under discussion which has a number of inserts which can be interchangeably substituted to establish various mold cavity arrays thereby enabling one mold assembly to accomodate a plurality of different battery configurations for the cell connecting straps and posts.

More particularly, the invention employs a mold frame containing the molten metal flow channel as a base structure to which are secured one or more inserts having portions of mold cavities and coolant channels proximate those cavities. Post cavities such as those for terminal and cell connector posts may be formed into the upper surfaces of the inserts. The bottoms of strap cavities, which are more shallow than post cavities are also formed on the upper surface of the inserts. Means for maintaining the inserts in overflow filling relation to the mold frame flow channel include seals against leakage of the molten metal as it passes across an upper surface of the mold frame to and across upper surfaces of the insert.

Side walls for the strap cavities and portions of side walls for the post cavities are defined by replaceable elements or adapters for modifying the size and relative placement of the cavities. These adapters have been termed "comb plates." The comb plates fit into seats in the upper face of the inserts and can take various forms in accordance with the strap configurations desired for the battery cell assemblies to be formed.

Thermal cycling of the comb plates is severe since they are contacted directly by flame in the heating and deoxidizing steps of the cast-on-process and are in intimate contact with the chilled inserts during the solidification of the molten metal. The strap cavities are relatively shallow and the comb plates are thin. They tend to distort during thermal cycling. In order to minimize these distorting effects, the comb plates are engaged with the inserts on which they are mounted by undercut portions which interlock with the insert and with pins or keys at junctions with the insert. A plurality of comb plates can be provided for each insert to enable different strap combinations to be formed for different battery configurations. For example, a single mold frame and a set of mold inserts can be employed with three different sets of comb plates for the casting on of straps and posts for six cell batteries having eleven, thirteen, or fifteen plates per cell.

In accordance with the above, an object of this invention is to improve mold assemblies for battery strap and post cast-on apparatus.

Another object is to enable a plurality of different battery strap and post configurations to be accomodated in a single major mold structure.

A third object is to avoid or minimize thermal distortion in battery strap and post mold assemblies.

BRIEF DESCRIPTION OF THE DRAWINGS

The above objects and features are realized with apparatus as disclosed in the accompanying drawings wherein:

FIG. 4 is a plan view of a mold assembly which can be incorporated in FIGS. 1, 2, and 3 and includes improvements according to this invention;

FIG. 5 is a plan view of a comb plate for an eleven plate per cell array which can be substituted for the comb plate for a fifteen plate per cell array as shown in FIG. 4.

DETAILED DESCRIPTION OF THE PREFERRED EMBODIMENT

Figures 1, 2, 3:
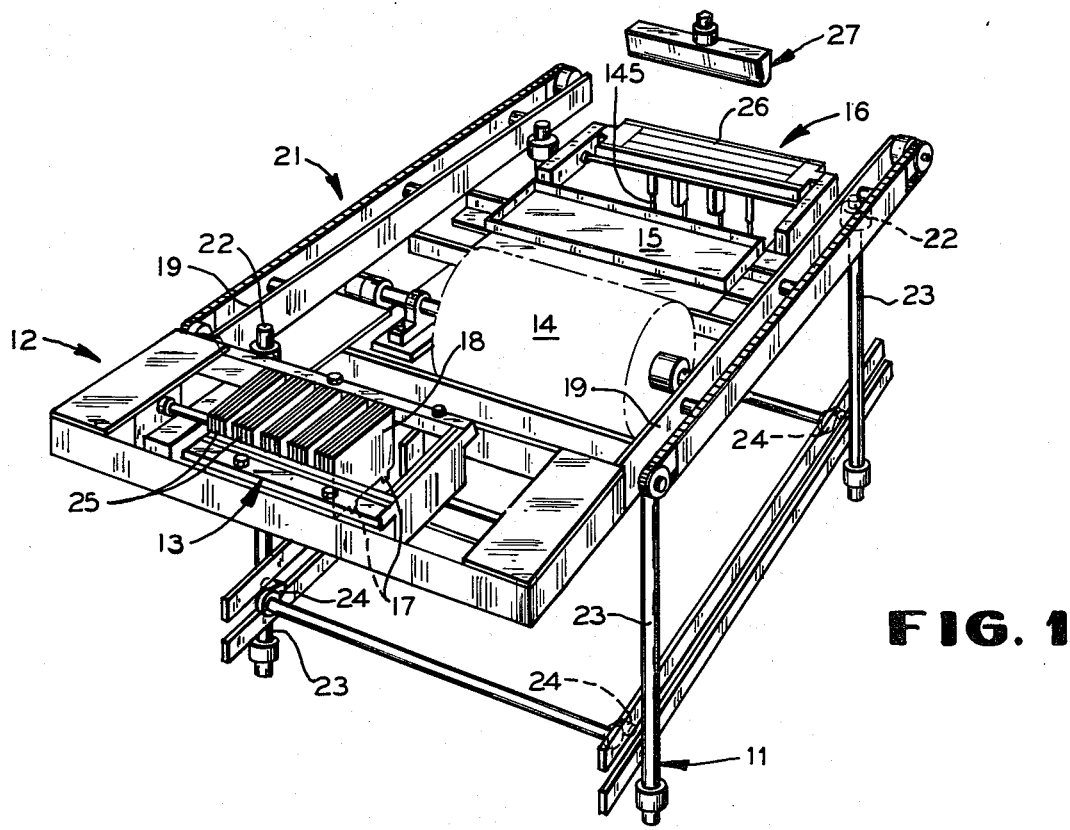
FIG. 1 is a perspective view with some elements eliminated and others shown fragmentarily of one form of cast-on apparatus utilizing the mold structure of this invention.
FIG. 2 is a schematic perspective view of the molten metal flow circuit of the apparatus of FIG. 1 including the retort for melting the casting metal.
FIG. 3 is a schematic view of the coolant circuit of the apparatus of FIG. 1 viewed from beneath the mold assembly.

An apparatus in which the mold assembly of this invention is utilized is disclosed in FIG. 1 as comprising a base support 11 having a transfer station 12 for loading and unloading lead-acid battery cells, a plural cell clamp and carriage 13, a lug burnishing station 14, a lug fluxing station 15, and a cast-on station 16. Controls (not shown) for the apparatus are automatically or semi-automatically operated to advance the carriage 13 through a cycle from the transfer station 12 through the burnishing, fluxing, and cast-on stations and back to the transfer station in proper timing sequence to result in casting cell straps on the lugs 17 of the positive and negative battery plates 18 of each cell to connect those respective lugs electrically and mechanically and to form intercell connector posts and battery terminal posts (neither of which are shwon) in appropriate spatial relationship for placement in a battery case.

The apparatus includes guide rails 19 and drive means 21 for reciprocating the carriage along those rails mounted on an elevating mechanism comprising corner rods 22 telescopically mounted in the leg tubes 23 of the base and reciprocally driven therein by cams 24 operating on followers coupled to the rods 22 through slots (not shown) in leg tubes 23. Stacks 25 of interleaved positive and nagative battery plates with suitable insulating separators are mounted in the relative positions they will assume in the completed battery structure in which they will be incorporated with their lugs extending downward in carriage 13 and clamped therein. While not shown in detail, one arrangement for mounting and removing work product utilizes a carriage which can be inverted around its longitudinal axis, a horizontal axis transverse of the path of movement of the carriage along the rails. The pre-stacked plate and separator groupings for individual cells are placed in the carriage 13 when it is inverted from the position shown in FIG. 1. Plate alignment can be insured by vibrating or tamping the stack 25 against a bottom reference surface (not shown). The carriage clamp controls (not shown) can then be placed in their stack gripping condition and the carriage inverted to the position shown in FIG. 1.

As will become more evident, batteries can be processed on the apparatus with various plate sizes and different numbers of plates in each cell and different numbers of cells. Variations in plate size may require changing the clamping mechanism within carriage 13 as be changing the width of the space into which stacks are inserted. Variations in the number of plates in each cell of battery assemblies of like size plates and a given casing length can be accomplished by modifying the section clamp spacing in the carriage clamp 13 to reduce the spacing between cells having a greater number of plates and thus, thicker plate-separator stacks, and increasing the spacing in the clamp between cells for the thinner plate-separator stacks of those batteries having fewer plates per cell to be fitted in the same overall casing length. The details of the plate stack clamps and the stack spacers have not been shown here and are discussed to illustrate the need for variations in plate lug strap connector length and spacing afforded by the mold assembly of FIGS. 4 through 8, and the recognition that an accomodation for these variations is to be provided in the carriage and clamp combination 13.

When all cell stacks 25 are mounted in the carriage 13 and the carriage is inverted, it is transferred to rails 19 and elevated to a level permitting it to be advanced across the burnishing station with the depending plate lugs 17 carried through a rotating burnishing brush. The carriage then is advanced to a position above fluxing station 15, is stopped in its traverse by drive means 21 and lowered by depressing guide rails 19 to dip lugs 17 into a pan of fluxing solution. The carriage and burnished and fluxed lugs it supports are raised to permit excess flux to drain into the pan.

At an appropriate point in the cycle of the apparatus, a mold assembly 26 mounted in the cast-on station is preconditioned for the cast-on operation by a heating and deoxidizing step. This step is performed by directing a somewhat reducing gas flame over the surface of the mold assembly from a burner head 27. Burner head 27 is mounted on an elevator (not shown) coordinated with the other operations so that it is lowered the appropriate preheat interval ahead of the next cast-on operation and the flame increased to condition the mold and molten metal surface contained by the mold. When the temperature desired is achieved, as may be sensed by a thermocouple (not shown) mounted in a body including a mold cavity wall, the flame from burner 27 is reduced to a standby level and the burner head is elevated to clear the cast-on station 16.

Carriage 13 is advanced in its elevated condition from the fluxing station to the cast-on station 16 and when above the cast-on station is lowered toward the mold assembly 26 by depressing rails 19 to immerse lugs 17 in the mold cavities for the connector straps. At this time the mold cavities have been filled with molten metal and the initiation of a merging of the lug material and molten metal occurs.

Coolant is circulated in the portion of the mold assembly proximate the mold cavities after the lugs are immersed to freeze the posts and straps. When frozen sufficiently, for example as sensed by a thermocouple in the mold wall indicating a drop in temperature to a predetermined level, the cast posts and straps are extracted from their cavities by the simultaneous operation of extractors and the carriage elevator. The cell units with their cast-on straps and posts are then returned along an elevated path to clear the fluxing station 15 and the burnishing station 14 to the transfer station 12 where, for example, the machine operator inverts the carriage to locate the straps and posts uppermost and then releases the clamp to permit the cells to drop into a battery casing (not shown) positioned below the carriage or placed over the assembly prior to its inversion. Since the clamp and mold cavities were arranged to space the cells according to their final relative position in the casing, the encased cells can be advanced to their next processing station.

The cast-on process outlined utilizes a mold filling technique illustrated in FIG. 2. A container or pot 31 for molten metal, hereinafter termed lead, is heated as by heater 32 to maintain the lead molten. Molten lead is circulated through the mold assembly 26 by a pump 33 having a suction line 34 immersed in the lead and a feed line 35 coupled to an input sump 36 in the assembly. From the sump 36, the lead flows through a channel 38 extending longitudinally of the mold assembly 26 to an output sump 39 and thence to a return line 41 to the pot 31. When it is desired to fill the mold cavities, a gate 42 in sump 39 between the channel side of the sump and its exit port 43 to return line 41 is closed so that the continued flow of molten lead into input sump 36 raises the level of the lead until it overflows channel 38 and the longitudinal weirs 44 defining the mold cavity sides proximate channel 38 and, by their height, the depth of lead to be retained in the cavities. When the gate 42 has been closed long enough to flood the area of the upper face of mold assembly 38 bounded by the perimeter dams 45, thereby filling the mold cavities for the terminals, connector posts and straps, cavities 46, 47, and 48 respectively the gate 42 is opened to drain the channel and the surfaces 49 along its sides to the weirs 44 to the normal flow level in the channel. Weirs 44 retain molten lead in the cavities of which they form walls at the level of their height. Upon removal of the heating and deoxidizing burner head 27, the lugs 17 are immersed in strap cavities 48.

Apparatus for gate control is represented by a solenoid 51 coupled by a rod and clevis 52 to a beam 53 pivoted at 54 and carrying the gate 42 at its opposite end.

A substantial degree of precision control of thermal conditions is required at the cast-on station 16 if significant high quality and quantity production is to be achieved. The channel and sumps must not be cooled to a degree which would freeze off the flow of molten lead. The mold cavities must be cooled sufficiently to solidify the lead for extraction. The molten metal in the cavities cannot be so hot at the time the lugs 17 are immersed that they detrimentally affect the overlying cell stacks 25 or totally melt the lugs. However, the molten metal must have sufficient heat to fuse the straps to the lugs without forming weak mechanical bonds or high resistance electrical interfaces. In addition, the post cavities should be cooled to provide ultimate mechanical strength. All of the above thermal considerations should be met in a short time to provide a short machine cycle and increased machine productivity.

Cooling of portions of the mold assembly containing the mold cavities is utilized to enhance thermal control of the equipment and cast-on process. The coolant circuit shown in FIG. 3 is arranged to maximize the cooling effect on the machine cycle at the appropriate portion of that cycle by passing a liquid coolant through mold inserts 55 and 56. These inserts are separate from the main frame or base structure 57 of the mold assembly 26 so that thermal barriers can be formed between the base 57 and inserts 55 and 56 and inserts can be replaced when worn or substituted to provide different cavity configurations. Since terminal post cavities are located at the ends of the battery assemblies and those cavities are frequently of greater depth and thickness than the straps, cold coolant is introduced at the ends of the inserts and withdrawn at a higher temperature toward the longitudinal center of the inserts. As shown in FIG. 3, coolant from a coolant supply 58, typically a cold water source, is fed by conduit 59 to a control 61 having an output conduit 62 branched at 63 and 64 to the opposed ends of inserts 55 and 56. The conduits 63 and 64 have their flow of coolant split into two feeds through throttle valves 65 to input conduits 66 entering each end of inserts 55 and 56. As will be seen in FIG. 4, the coolant circulates around the post cavities 46 and 47 and over the wall forming the bottom surface of strap cavities 48 in inserts 55 and 56. It then passes to exit conduits 67 which are joined at drain line 68.

When sufficient coolant has been circulated through inserts 55 and 56 to reduce the temperature to a level which enables the lead in the mold cavities to solidify, as sensed by thermocouple 69, control 61 stops the flow of water and thereafter applies drying air from source 71 through the conduit system to and through inserts 55 and 56 so that destructive steam will not be generated on the next heating cycle of the cast-on apparatus.

Figure 6:
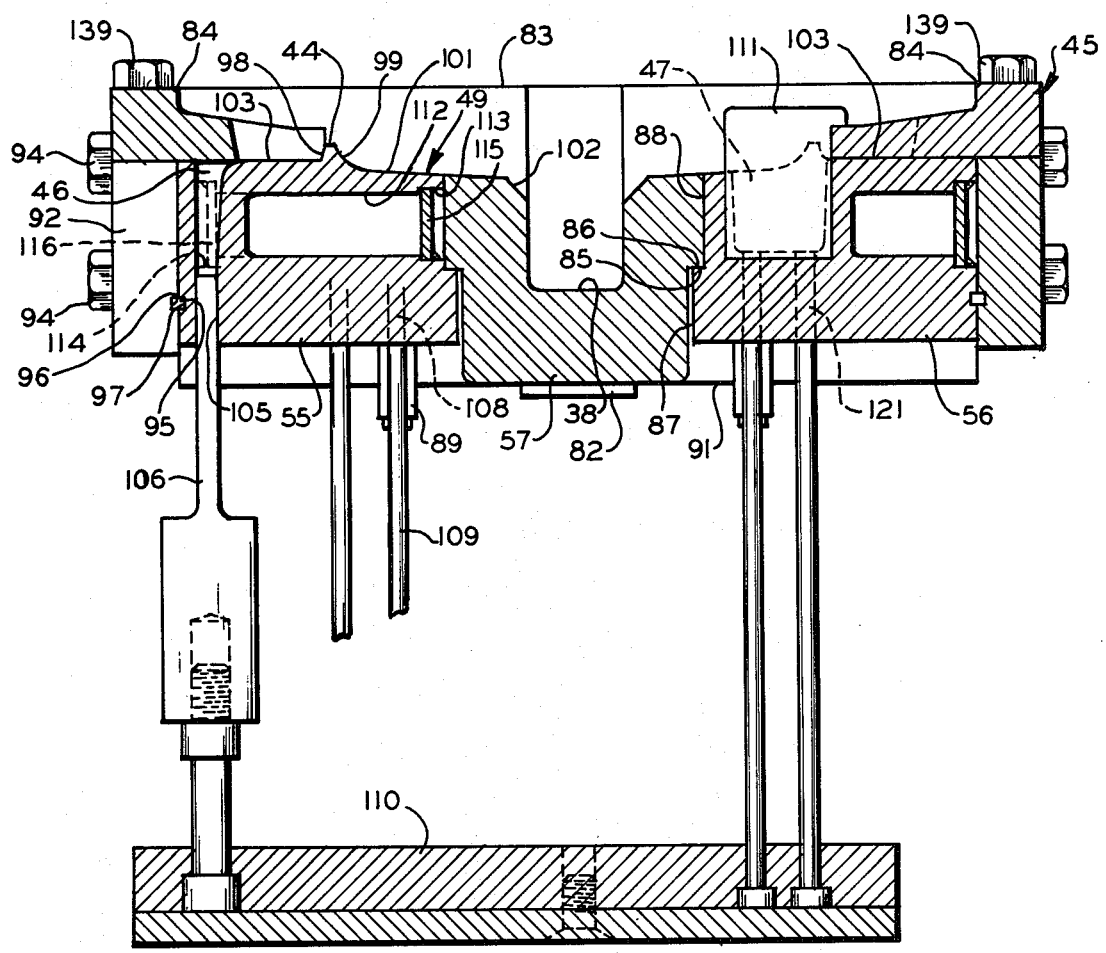
FIG. 6 is a sectional view of the mold assembly taken along the line 6—6 of FIG. 4.

The mold assembly of this invention as shown in FIGS. 4 and 6 is made up of a frame or base 57 advantageously machined from a casting and arranged to mount separably therefrom one or more mold inserts 55 and 56 which may be formed from cold drawn free machine steel. Mold cavities 46, 47, and 48 for the terminal posts, connector posts, and lug straps are formed partially in the inserts 55 and 56 and partially in adapter members superimposed and separately mounted on the insert upper surfaces as comb plates 74 and 75.

The frame or base 57 in combination with the inserts 55 and 56 comprise a body which in the cast-on station 16 presents a generally horizontal upper surface to the lead flowing in the flow channel 38 so that when the channel is dammed at its downstream end at 42 the lead overflows portions of the upper surface of the body. The inserts 55 and 56 have hollow interiors beneath portions of the upper surface which they comprise to facilitate the cooling of cast bodies by the passage of the coolant therethrough. An adapter member 75 is mounted on the portions of the insert upper surfaces in molten metal tight relationship to those surfaces so that cavities formed in the adapter members are filled with lead when the lead in flow channel 38 is caused to overflow. A perimeter dam, in part on the base and in part on the adapter members contains the overflowing lead on the mold assembly. As shown, the base 57 is relatively massive and has opposed transverse end members or cross arms 78 joined by an elongate longitudinal member 79 having the flow channel 38 extend along its length with the margins of the flow channel forming a portion of the upper surface of the mold body across which lead overflows. This massive base retains heat during the cooling of the molds to sustain the molten condition of the flowing lead. Inserts 55 and 56 are separably secured between end members 78 and against longitudinal member 79 which provides a further portion of the upper surface of the mold body over which the overflowed lead flows.

The cavities of the adapter members 75 are advantageously formed through the thickness with upwardly divergent walls to define mold cavity side walls from which molded bodies can be extracted upward. In such arrangement, the upper surface portions of the inserts 55 and 56 which are in registry with the cavities in the top surface of the adapter members form the bottoms of the mold cavities in intimate heat transfer relationship with the coolant passages. Where connector posts to adjacent cells of the battery are to be formed integral with the plate connector strap or battery terminals, the upper surface of the inserts are formed with post cavities 47 or 46 respectively in registry with the cavities 48 in the top surface of the adapter member.

A preferred arrangement of the mounting of the adapter members on the inserts is to include a weir 44 on the inserts extending along side of the channel 38 and to form a planar portion on the upper surface of the insert on the side of the weir remote from the channel as a mounting surface for an adapter member having a planar lower surface and a top surface at least as high as the weir so that it provides partitions for the cast lead retained in the cavities 46, 47, and 48 behind the weir. The adapter members 75 are mounted with surfaces adjacent to and abutting the weir in molten metal tight relationship to the weir. Cavities in the adapter member can be located along the surfaces adjacent to and abutting the weir of the inserts, thus defining indentations between extensions of the adapter as comb teeth, whereby the weir forms one side wall of the mold cavities and the indentations from the remaining side walls of the mold cavities. These extensions or comb teeth are subject to thermal distortion and thus to developing leak paths for lead into the region between the insert and the adapter member. Fastening means are provided between the insert and the adapter member at these extensions to fasten the extensions against the upper surface of the insert without interfering with the extraction of the molded elements to thereby maintain a molten metal tight relationship between the insert and adapter. One form of fastening is a key in the form of a dowel pin and socket on the ends of the extensions and the side wall of the weir. Another form of fastening, employed where a connector post mold separator plate or divider partition 111 is fitted into a body cavity in the insert adjacent the weir and extending therefrom laterally, is a cantilever 137 in the separator extending laterally beyond the body cavity over the upper surface, spaced therefrom the thickness of the adapter member adjacent the body cavity so that a portion of the adapter member extending to the body cavity and in registry with the cantilever fits beneath the cantilever and is retained thereby against the insert upper surface in molten metal tight relationship. Cavities in the insert are continuous with the partition containing body cavity to form an integral connector strap-connector post mold cavity.

Frame or base 57 is adapted to be secured to base support 11 for the machine at its cast-on station 16 by means of bosses 76 containing sockets 77 on each end to receive and be engaged by suitable clamping means. Cross arms 78 at the ends of frame 57 are joined by an elongate body portion 79. It should be noted that in the illustrated construction, the elongate body portion 79 is centered transverse of the arms and is formed to have a lead flow channel 38 extend throughout its length; however, the frame can be rectangular with opposed elongate body portions (not shown) extending with their lead flow channels in transverse spaced relationship between the end portions where the strap and post transverse spacings of the battery to be formed are so close as to not permit a central longitudinal member and lead flow channel. In either construction, an open region bounded by the proximate sides of the cross arms 78 and a side of the elongate body portion 79 is adapted to receive a mold insert 55 and/or 56.

Frame 57 includes sumps 36 and 39 which are interchangeable and therefore are each formed with guide slots 81 in their side walls adapted to receive mold gate 42 as discussed above. A port 43 is bored and tapped through the bottom of each sump such that an exit fitting for molten lead communicates with the sump 39 outboard of flow channel 38. That sump designated the input sump 36, if supplied lead from above, has its port 43 closed by a plate 82 secured to the bottom of the frame 57. The upper face of 83, the cross arms 78 of frame 57, are at a height above the top of mold gate 42 when in the closed position so that no overflow path for molten lead exists across the cross arms and perimeter portions around the sumps 36 and 39, flow channel 38, and sides adjacent the inserts 55 and 56, and comb plates 74 and 75, form a portion of the lead containing dam 45. The remainder of that lead dam 45 is provided by the outermost portions 84 of comb plates 74 and 75.

As best seen in FIG. 6, the inserts are engaged with the frame 57 at an undercut flange 85 forming a lead seal with a complimentary flange 86 on the inserts 55 and 56. The inserts are chilled to below the freezing temperature of lead while the frame 57 must maintain lead in channel 38 flowing throughout operation of the apparatus. A thermal barrier is provided between the frame and inserts in their lower interfacial regions by spacing their walls to form an air gap 87 therebetween. In their upper interfacial regions along the line 88, there also is a small gap which opens when the mold assembly is at operating temperatures to afford an air gap or lead filled gap between the frame and inserts along the surface represented by line 88. The lead seal at engaged flanges 85 and 86 is maintained by insert lock plates 89 which are secured to the frame 57 at its under surfaces 91 by machine screws and have cantilevered fingers which compress the inserts upward.

Inserts 55 and 57 are further secured by clamp bars 92 fastened to the lateral end 93 of cross arms 78 as by machine screws 94. Inserts 55 and 56 are keyed on their outer lateral faces to their respective lock plates 92 by keys 95 fitting in complimentary keyways 96 in plates 92 and 97 in inserts 55 and 56.

The overflow surface 49 between channel 38 and weir 44 comprises a portion of the upper surface of elongate body portion 79 and an upper surface of each insert 55 and 56. The surface 49 is pitched to cause all lead on the channel side of weir 44 to return to the channel when gate 42 is opened to conclude the overflow filling of the mold cavities 46, 47, and 48. Conveniently, a typical weir 44 in plan will follow the perimeter of the mold cavity sides proximate the flow channel and will have a narrow flat top with a narrowing taper 98 toward the bottom of the cavities and an arcuate face 99 which merges into a surface 101 inclined at about 3.5° to the horizontal toward the channel 38. A chamfer 102 couples surface 101 with the channel 38. Drain surface 101 is continuous in its inclination across the inserts and their adjacent frame portions.

Outboard from the weir 44 the upper surface 103 of the inserts is flat and smooth. Surface 103 forms the bottom of the strap mold cavities 48 for the several strap mold configurations to be established in the assembly. Each insert has its interior hollowed to provide coolant passages beneath surface 103. Bosses are retained to provide material in which the post mold cavities 46 and 47 are formed.

The illustrated mold assembly is for a side terminal battery and, therefore, has both terminals at the outer lateral portions of the connector straps for the end cells. Terminal post insert 55 therefore is formed with a boss 104 on its outer side at each end in which terminal cavities 46 and the passages 105 for terminal ejectors 106 are formed. Terminal insert 55 also has two pairs of intercell connector post cavities 47 on its inner face and, therefore, has two connector post bosses 107 in its interior in each of which is formed a cavity from surface 103 and in communication therewith from the underside of the assembly two pairs of passages 108 for paired connector post ejector pins 109. The individual connector post mold cavities are formed from the single cavity in each boss 107 by securing a divider partition 111 in the cavity between the stroke path of the ejector pins. Advantageously, the hollow interior of insert 55 is machined from the opposite sides of the insert in a region above the flange 86 and sufficiently below surfaces 101 and 103 to provide adequate strength. The hollow section 112 is formed as ports 113 adjacent bosses 107 on the inner face and as ports 114 adjacent bosses 104 on the outer face and those ports are closed by insetting seal plates 115 and 116 respectively, which may be recessed to further thermally insulate the interface region between frame 57 and insert 55.

Ejectors 106 and 109 are operated in synchronism with the carriage elevator. Ejector plate 110 is raised slightly in advance of or with the elevator to facilitate the removal of the cast posts from the mold cavities 46 and 47.

Intercell connector insert 56 has a hollow interior 117 formed by machining through a port 118 in its outer face to varying depths such that bosses 119 are retained for the formation of the connector post mold cavities 47 and their extractor pin passages 121. A single seal plate 122 closes port 118 to enclose hollow interior 117 as a coolant passage.

Coolant inlet apertures 123 for coupling input conduits 66 extend through the bottom of the inserts 55 and 56 as do coolant exit apertures 124.

Adaptors for the various battery configurations which can be formed with the illustrated mold assembly frame 57 and inserts 55 and 56 comprise members which fit upon surface 103 of each insert to define the outer lateral walls 125 and the opposed end walls 126 of each of the connector strap mold cavities 48 and portions of the base region of the post mold cavities as the wall 127 for terminal post mold cavities 46 and the wall 128 for intercell connector post mold cavities 47. A set of adaptors for different lengths of connector strap cavities is represented by the typical adaptor or comb plate 129 of FIG. 5 for an eleven plate per cell battery as compared to the counterpart comb plate 74 of FIG. 4 for a fifteen plate per cell battery. It will be noted that the filler regions 131 at the ends of comb plate 129 are longer than the filler regions 132 at the ends of comb plate 75 and that the intercavity partitions 133 of plate 129 are wider than those 134 of plate 74. The battery with fewer plates per cell is accomodated by shorter connector straps. It should further be noted that in the examples, when viewed from left to right, the odd or negative plate connector straps mold cavities are longer than the even or positive plate connector strap mold cavities. This is attributable to the construction of cells with negative plates on each end and thus one greater negative plate than positive plate.

Figure 7:
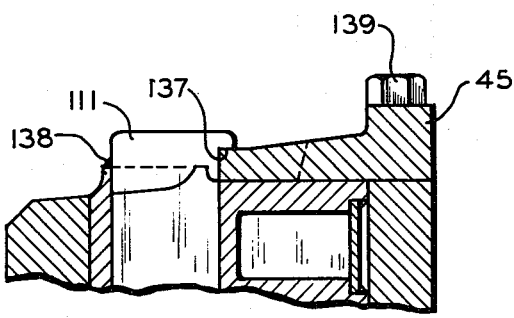
FIG. 7 is a fragmentary sectional view of a detail at the connector post divider taken along the line 7—7 of FIG. 4.
Figure 8:
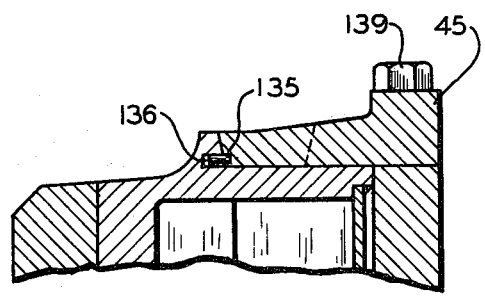
FIG. 8 is a fragmentary sectional view of a detail at the comb plate wall dividing strap connector cavities taken along the line 8—8 of FIG. 4.

In order that the comb plates can be mounted on surface 103 without leaking lead at the interface with that surface, they are provided with mechanically interlocking elements. These elements are in the same location on each adapter or comb plate so that they can each be operatively associated with the insert, and inserts are interchangeable. Comb plates are coupled to their inserts by means of dowel pins 135 at their edges, joining with and abutting the weir wall 98 as at the edges of end fillers 131 and 132 and the ends of those partitions 133 and 134 which do not intercept the intercell post connector mold cavities 47. Dowel pins 135 are secured in the comb plates and fit into registering pin sockets 136 in wall 98 as best seen in FIG. 8. Where the partitions intercept cavities 47, there is no abutment to wall 98 and a hold down function is achieved by providing cantilever 137 on the post mold cavity divider 111 whereby the end of the strap cavity partition aligned therewith fits beneath the lip of that cantilever. As best seen in FIG. 7, the divider 111 is welded to the insert at the top of weir 44 at 138 and closely fits the walls of the cavity forming adjacent connector post mold cavities 47.

The outer margin of the inserts are secured to the clamp bar 92 by machine screws 139. This margin region 84 is at a height sufficient to enclose the flooded area between the cross arms 78 and complete the perimeter dam 45 around the area which is flooded with molten lead during the filling of the mold cavities.

It is to be appreciated that the invention can be in various forms without departing from its spirit and scope. For example, different assembly means can be employed, different cavity forms are contemplated for both the insert cavities and the adapter cavities and the base can be a rectangular frame enclosing the two inserts rather than an H form. Accordingly, this disclosure is to be read as illustrative and not in a limiting sense.

What is claimed is:

1. A mold assembly for casting straps and posts on plates of lead-acid storage batteries, comprising a base having an upper surface provided with an elongate channel defined by side-wall portions and having a molten metal receiving region cooperating with said elongated channel and a molten metal exit region spaced from said receiving region cooperating with said elongate channel, said channel being adapted to be selectively blocked, by blocking means associated with said exit region, to the flow of molten metal downstream of said receiving region to cause the flowing metal introduced at said receiving region to overflow the side wall portions of said elongate channel; an insert associated with said base having a generally horizontal upper surface and having a hollow interior beneath said generally horizontal upper surface; means maintaining said insert in molten metal tight relationship to said base adjacent said channel with said upper surface of the insert in molten metal overflowing relationship to said channel side wall portions; means operatively associated with the insert for introducing a coolant fluid into the hollow interior of said insert; a mounting surface on said insert; an adapter member separably mounted on said mounting surface of said insert in molten metal tight relationship to said mounting surface, said adapter member having a top surface higher than said mounting surface of said insert when mounted thereon and provided with cavities located in the top surface thereof, said upper surface of said insert having a plurality of cavities adapted to be filled by overflowing metal from said channel; and a perimeter dam associated with said adapter member surrounding said cavities in said insert and adapter member and said channel in said base for containing said overflowing molten metal on said upper and top surfaces.

2. A mold assembly according to claim 1, including a second adapter member adapted to be separably mounted on said mounting surface of said insert in molten metal tight relationship to said surface in place of said first mentioned adapter member, said second adapter member having a top surface higher than said mounting surface when mounted thereon, and said second adapter member top surface having a plurality of cavities of different configuration from said cavities of said first mentioned adapter member said cavities being adapted to be filled by overflowing molten metal from said channel.

3. A mold assembly according to claim 1, wherein said adapter member cavities extend through said adapter member to expose said mounting surface whereby side walls of said adapter member cavities cooperate with exposed regions of said mounting surface to define mold cavities.

4. A mold assembly according to claim 3, wherein said mounting surface is generally planar and contains a cavity in registry with a cavity in said adapter member.

5. A mold assembly according to claim 1, including a weir on said upper surface of said insert extending along side of said channel; wherein said mounting surface is a planar portion of said upper surface on the side of said weir remote from said channel; and wherein said adapter member has a planar lower surface mating with said planar upper surface, a top surface at least as high as said weir, and side surfaces adjacent to and abutting said weir in molten metal tight relationship thereto.

6. A mold assembly according to claim 5, wherein said adapter member cavities extend through said adapter member to expose said mounting surface whereby side walls of said adapter member cavity cooperate with exposed regions of said mounting surface to define mold cavities.

7. A mold assembly according to claim 6, wherein said adapter member cavities are defined by said side surfaces adjacent to and abutting said weir and indentations in said side surfaces whereby weir forms one side wall of said mold cavities and said side surfaces and indentations define the remaining side walls of said mold cavities.

8. A mold assembly according to claim 7, including fastening means between said weir and portions of said adapter member having said abutting side surfaces to separably fasten the adapter member portions having said abutting side surfaces against said planar upper surface of said insert in molten metal tight relation thereto.

9. A mold assembly according to claim 7, including dowel pins in sockets formed partially in said weir and in said abutting side surfaces to separably fasten the adapter member portions having said abutting side surfaces against said planar upper surface of said insert in molten metal tight relation thereto.

10. A mold assembly according to claim 7, including a cavity formed in said mounting surface of said insert adjacent said weir; a divider plate in said insert cavity extending across said insert cavity from said weir to separate said insert cavity into two post mold cavities; a cantilever portion on said divider extending laterally beyond said insert cavity over said mounting surface and spaced therefrom the thickness of said adapter member adjacent said insert cavity; a portion of the adapter member extending to said insert cavity in registry with said cantilever portion of said divider and having adapter member cavities registering with said insert cavity to fit separably between said cantilever portion and said mounting surface of said insert whereby said cantilever portion retains said adapter member portion against said mounting surface of said insert in molten metal tight relation thereto.

11. A mold assembly according to claim 8, including a second adapter member adapted to be separably mounted on said portions of said mounting surface of said insert in molten metal tight relationship to said surface in place of said first mentioned adapter member, said second adapter member having a second plurality of cavities defined by the side surfaces adjacent to and abutting said weir and by indentations in said side surfaces, said second plurality cavities having a different configuration than that of said plurality of cavities of said first mentioned adapter member; and fastening means for said second adapter member between said weir and said abutting side surfaces of said adapter member to separably fasten the second adapter member portions having said abutting surfaces against said planar mounting surface of said insert in molten metal tight relation thereto, said fastening means on said second adapter member cooperating with the same fastening means on said weir with which said first mentioned fastening means cooperated.

12. A mold assembly according to claim 9, including a cavity formed in said mounting surface of said insert adjacent said weir, a divider plate in said insert cavity extending from said weir across said insert cavity to separate said insert cavity into two post mold cavities; a cantilever portion on said divider extending laterally beyond said insert cavity over said mounting surface and spaced therefrom the thickness of said adapter member adjacent said insert cavity; a portion of the adapter member extending to said insert cavity in registry with said cantilever portion of said divider and having adapter member cavities registering with said insert cavity to fit separably between said cantilever portion and said upper surface of said insert whereby said cantilever portion retains said adapter member portion against said mounting surface of said insert in molten metal tight relation thereto.

13. A mold assembly according to claim 1, wherein said base comprises a relatively massive body; opposed transverse end members associated with said base; a longitudinal member associated with said base, integral therewith and extending between said end members and having said flow channel extend along its length; said insert being separably mounted on said base between said opposed end members and proximate said longitudinal member.

* * * * *